United States Patent

Huang

[11] Patent Number: 5,971,451
[45] Date of Patent: Oct. 26, 1999

[54] VEHICLE BUMPER

[76] Inventor: Ching-Yuan Huang, No.2, Lane 24, Yangteh Ave., Sec. 1, Taipei, Taiwan

[21] Appl. No.: 09/030,839

[22] Filed: Feb. 26, 1998

[51] Int. Cl.$^6$ .................................................. B60R 19/02
[52] U.S. Cl. .......................... 293/102; 293/121; 293/132; 293/135
[58] Field of Search .................................. 293/102, 121, 293/133, 135, 136, 137

[56] References Cited

U.S. PATENT DOCUMENTS

| | | | |
|---|---|---|---|
| 3,831,847 | 8/1974 | Serritella | 293/1 |
| 3,841,683 | 10/1974 | Toro | 293/136 |
| 3,937,508 | 2/1976 | Glance et al. | 293/121 |
| 4,042,057 | 8/1977 | Beckley | 293/60 |
| 4,167,282 | 9/1979 | Matsuyama | 293/121 |
| 4,592,580 | 6/1986 | Stanganelli et al. | 293/136 |
| 4,807,915 | 2/1989 | Shyi | 293/137 |
| 4,889,374 | 12/1989 | Choun | 293/132 |
| 5,370,430 | 12/1994 | Mozafari | 293/120 |

FOREIGN PATENT DOCUMENTS

| | | | |
|---|---|---|---|
| 323 038 | 7/1989 | European Pat. Off. | 293/102 |
| 3325 104 | 1/1985 | Germany | 293/102 |
| 55-119542 | 9/1980 | Japan | 293/102 |

*Primary Examiner*—Joseph D. Pape
*Assistant Examiner*—Kiran Patel
*Attorney, Agent, or Firm*—Dougherty & Troxell

[57] ABSTRACT

Disclosed is a vehicle bumper including an inner bumper member, an outer bumper member with facial protective cover, and a plurality of mechanical cushions spacedly extended between the two bumper members. The inner bumper member is provided at an inner side with a plurality of fixedly mounted first pressure-resistant magnet sets and is connected to the front of a vehicle via connecting members extended from a backside of the inner bumper member. With the mechanical cushions, a buffer space is left between the two bumper members, allowing the bumper to produce a multiplied pressure-resistant effect and evenly absorb external force impacting on the vehicle. A plurality of second pressure-resistant magnet sets are fixedly mounted to an inner side of the outer bumper member corresponding to the first pressure-resistant magnet sets. The first and the second magnet sets are magnetically repulsive, so that the outer bumper member is pushed outward when it approaches to the inner bumper member under external force.

2 Claims, 1 Drawing Sheet

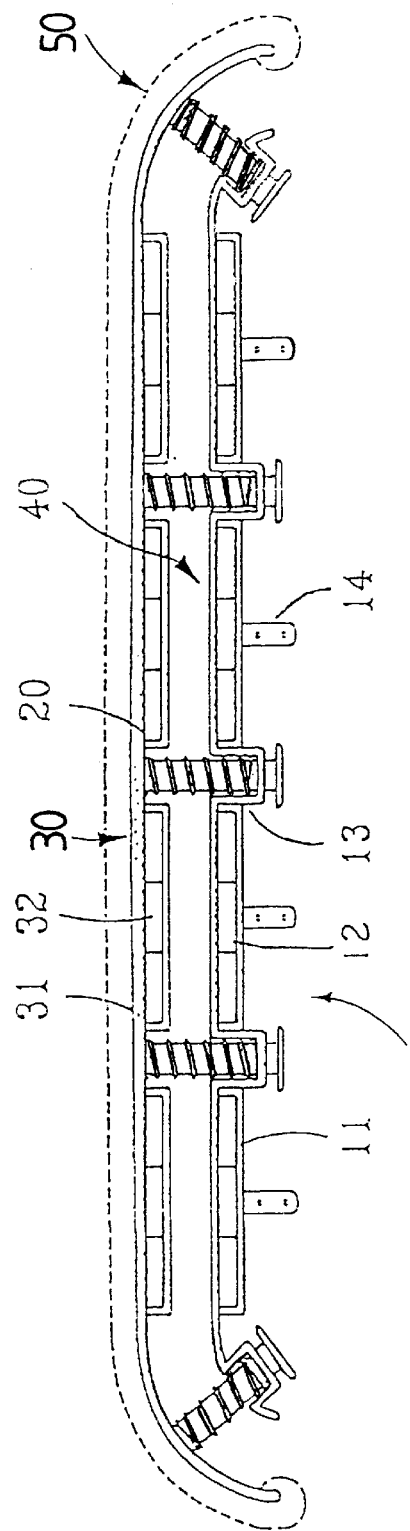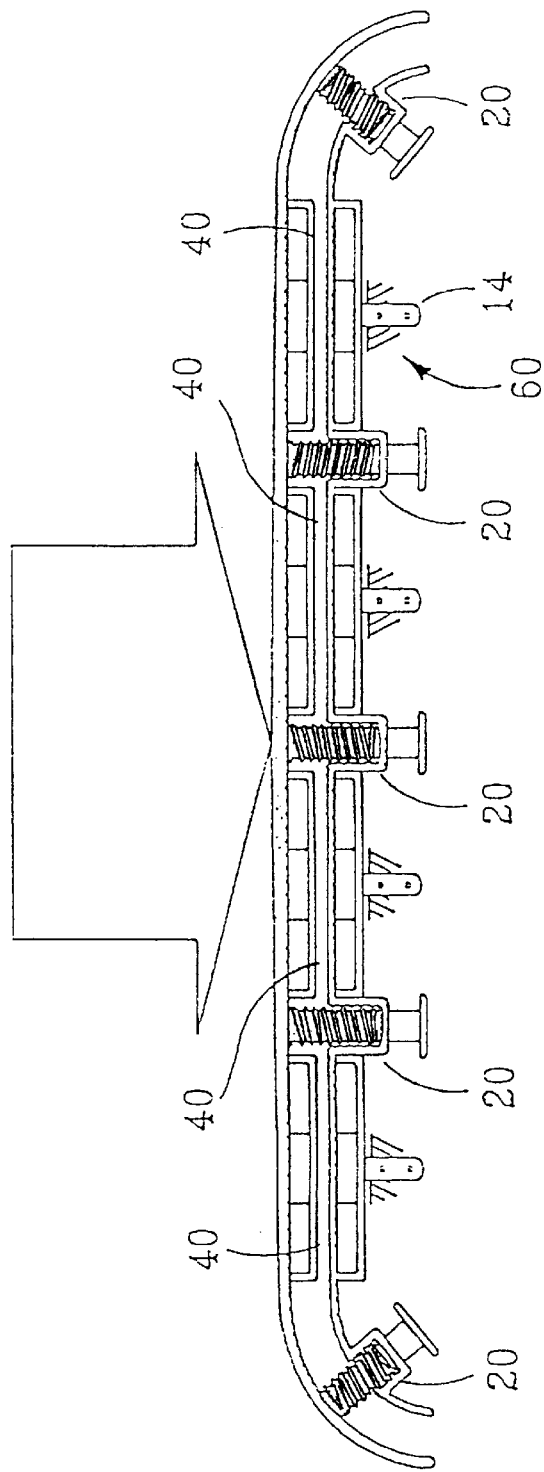

VEHICLE BUMPER

FIELD OF THE INVENTION

The present invention relates to a vehicle bumper, and more particularly to a bumper having inner and outer bumper members connected to one another by mechanical cushions to define a buffer space between them, so that the bumper may evenly absorb external force impacted on the vehicle with multiplied pressure-resistant effect. The two bumper members respectively have pressure-resistant magnet sets mounted thereto. These pressure-resistant magnet sets together with the buffer space which uses air as an interface between the two bumper members permit the bumper to have simple structure while effectively eliminate the problem of failed mechanical force transfer parts.

DESCRIPTION OF THE PRIOR ART

When a conventionally structured bumper is subjected to an external force, the force absorbed and transferred by the bumper tends to cause stress at some specific mechanical cushion parts, making these mechanical cushion parts to be easily damaged that results in a failed bumper incapable of protecting the vehicle and passengers.

It is therefore tried by the inventor to develop an improved bumper to eliminate drawbacks existing in the conventional bumper.

SUMMARY OF THE INVENTION

A primary object of the present invention is to provide a bumper which includes not only mechanical cushions but also a buffer space using air as an interface. Pressure-resistant magnet sets are separately mounted on inner and outer bumper members that together define the buffer space between them. The buffer space and the pressure-resistant magnet sets together produce a multiplied pressure-resistant effect to allow the whole bumper to evenly absorb external force impacted on the vehicle and protect the vehicle and passengers thereon. The buffer space also shares external force with the mechanical cushions to help the latter maintain a normal operation.

The advantage of the present invention is that it utilizes only a limited space to provide a multiplied pressure-resistant effect, so that the bumper can maintain a strong, effective, and safe buffer space while evenly absorbing external force impacted on the vehicle.

BRIEF DESCRIPTION OF THE DRAWINGS

A more complete understanding of these and other features and advantages of the present invention will become apparent from a careful consideration of the following detailed description of certain embodiments illustrated in the accompanying drawings, wherein:

FIG. 1 is a top plan view showing internal structure of a bumper according to a preferred embodiment of the present invention; and FIG. 2 is a top plan view showing the manner in which the bumper of the present invention works to evenly distribute and absorb an impact on the bumper.

DETAILED DESCRIPTION OF THE PREFERRED EMBODIMENT

Please refer to FIG. 1 which is a top plan view of a bumper according to the preferred embodiment of the present invention. As shown, the bumper mainly includes an inner bumper member 10, a plurality of first pressure-resistant magnet sets 12, a plurality of mechanical cushions 20, an outer bumper member 30, a plurality of second pressure-resistant magnet sets 32, and a decorative and protective facial cover 50.

A plurality of first fixing members 11 are fixedly attached to an inner side of the inner bumper member 10 and each has a first pressure-resistant magnet set 12 fixedly mounted therein. Portions of the inner bumper member 10 between two adjacent fixing members 11 form inward recesses 13 to each receive an inner end of the mechanical cushions 20 therein. A plurality of connecting members 14 are connected at one end to the inner bumper member 10 and at the other end to a lower steel frame 60 of a vehicle to which the bumper is mounted.

The outer bumper member 30 is fixedly connected at an inner side to outer ends of the mechanical cushions 20, so that the outer bumper member 30 is forward and backward movable relative to the inner bumper member 10. A plurality of second fixing members 31 are fixedly mounted to inner side of the outer bumper member 30 corresponding to the first fixing members 11 and each has a second pressure-resistant magnet set 32 fixedly mounted therein. The outer bumper member 30 has a smooth outer surface with the facial cover 50 fitly attached thereto. Surfaces of the first magnet sets 12 and of the second magnet sets 32 that face one another are magnetically repulsive. A buffer space 40 is therefore formed between the inner and the outer bumper members 10 and 30.

Please now refer to FIG. 2 which shows how an impact on the vehicle is absorb ed a nd evenly distributed by the bumper of the present invention to different parts on the bumper.

The whole bumper is fixedly mounted to a front of the vehicle by firmly fixing the connecting members 14 to the lower steel frame 60 of the vehicle. When a moving vehicle collides with something at a front end thereof, the outer bumper member 30 is impacted to exert a backward pressure on the mechanical cushions 20, forcing the latter to move inward. At this point, a large part of the collision force is absorbed by the mechanical cushions 20, and the buffer space 40 is reduced. The second magnet sets 32 mounted in the second fixing members 31 shift backward along with the outer bumper member 30 to approach to the first magnet sets 12 fixedly mounted on the inner bumper member 10. When the buffer space 40 is reduced to an extent for the first and the second magnet sets 12, 32 to magnetically repulse one another, the impact on the bumper is evenly distributed over and absorbed by the inner bumper member 10. The problem of damaged mechanical cushions 20 due to concentrated stress can therefore be avoided.

The buffer space 40 utilizes air as an interface and can therefore provide a multiplication effect in its pressure-resistant ability to, on the one hand, allow the bumper to function normally and, on the other hand, form a most effective protective means to ensure safety of the vehicle and the passengers on the vehicle.

When the bumper is released from an external force, the magnetic repulsion between the first and the second magnet sets 12, 32 and an extension force of the mechanical cushions 20 together push the outer bumper member 30 away from the inner bumper member 10 to a normal position. At this point, the buffer space 40 returns to its original size. The whole bumper automatically returns to its original standby condition.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A bumper for a vehicle comprising:

a) an inner bumper member attached to the vehicle;

b) a plurality of first fixing members attached to an inner side of the inner bumper member, each first fixing member having a first magnet set fixedly mounted therein;

c) an outer bumper member;

d) a plurality of second fixing members attached to an inner side of the outer bumper member, each second fixing member having a second magnet set fixedly mounted therein, the second fixing members located such that each second magnet set is aligned with a first magnet set and is magnetically repulsive to the aligned first magnet; and, e) a plurality of mechanical cushions connected to the inner bumper member and the outer bumper member so as to movably attach the outer bumper member to the inner bumper member forming a buffer space therebetween, the mechanical cushion enabling movement of the outer bumper member toward the inner bumper member whereby the first magnet sets and the second magnet sets magnetically repulse each other only after the buffer space has been reduced to a predetermined extent.

2. The bumper for a vehicle as claimed in claim 1, wherein said outer bumper member has a protective facial cover fitly attached to an outer surface thereof.

* * * * *